United States Patent
Crosby et al.

(10) Patent No.: US 12,373,907 B2
(45) Date of Patent: Jul. 29, 2025

(54) ADJUSTABLE ROBOT FOR PROVIDING SCALE OF VIRTUAL ASSETS AND IDENTIFYING OBJECTS IN AN INTERACTIVE SCENE

(71) Applicant: Sony Interactive Entertainment LLC, San Mateo, CA (US)

(72) Inventors: Derek Crosby, San Mateo, CA (US); Geoff Wedig, San Mateo, CA (US)

(73) Assignee: Sony Interactive Entertainment LLC, San Mateo, CA (US)

( * ) Notice: Subject to any disclaimer, the term of this patent is extended or adjusted under 35 U.S.C. 154(b) by 54 days.

(21) Appl. No.: 17/224,051

(22) Filed: Apr. 6, 2021

(65) Prior Publication Data
US 2022/0314112 A1 Oct. 6, 2022

(51) Int. Cl.
*A63F 13/52* (2014.01)
*A63F 13/56* (2014.01)
(Continued)

(52) U.S. Cl.
CPC ............ *G06T 1/0014* (2013.01); *A63F 13/52* (2014.09); *A63F 13/56* (2014.09); *A63F 13/65* (2014.09); *G06F 3/011* (2013.01); *G06T 7/32* (2017.01); *G06T 7/73* (2017.01); *G06T 13/40* (2013.01); *G06T 13/80* (2013.01); *G06T 15/205* (2013.01); *G06T 19/006* (2013.01); *A63F 2300/6607* (2013.01); *G06T 2207/30196* (2013.01)

(58) Field of Classification Search
CPC ........ A63F 13/65; A63F 13/602; A63F 13/52; A63F 13/56; G06T 19/006; G06T 1/0015; G06F 3/011; G06V 40/23
See application file for complete search history.

(56) References Cited

U.S. PATENT DOCUMENTS 9,836,117 B2 * 12/2017 Shapira ................ G05D 1/0038
10,675,766 B1 6/2020 Niemeyer et al.
(Continued)

OTHER PUBLICATIONS

PCT Notification of Transmittal of the International Search Report & the Written Opinion of the International Searching Authority, issued in corresponding PCT/2022/021928, mailed Aug. 9, 2022 (16 total pages).
(Continued)

*Primary Examiner* — Robert E Mosser
(74) *Attorney, Agent, or Firm* — Kilpatrick Townsend & Stockton LLP

(57) ABSTRACT

A method for generating action sequence data for a character to be rendered in a video game is provided. The method includes, during recording of an actor in a performance space, providing a cue to the actor to perform an action that simulates interacting with a virtual object at a location in the performance space. The method also includes instructing a robot to move to the location in the performance space at which the actor is to simulate interaction with the virtual object, and instructing the robot to adjust a physical attribute of the robot when at the location. The physical attribute of the robot, when adjusted, is placed at a three-dimensional location in the performance space to simulate a scale of the virtual object with which the actor is to simulate interaction. The virtual object can be either an animated object or a non-animated object.

17 Claims, 8 Drawing Sheets

(51) Int. Cl.
*A63F 13/65* (2014.01)
*G06F 3/01* (2006.01)
*G06T 1/00* (2006.01)
*G06T 7/32* (2017.01)
*G06T 7/73* (2017.01)
*G06T 13/40* (2011.01)
*G06T 13/80* (2011.01)
*G06T 15/20* (2011.01)
*G06T 19/00* (2011.01)

(56) References Cited

U.S. PATENT DOCUMENTS

| | | | |
|---|---|---|---|
| 10,796,489 B1* | 10/2020 | Cordes | A63F 13/655 |
| 10,885,691 B1* | 1/2021 | Parker | H04N 9/8227 |
| 2014/0267777 A1 | 9/2014 | Le Clerc et al. | |
| 2017/0322655 A1 | 11/2017 | Stafford | |
| 2018/0157317 A1* | 6/2018 | Richter | G06T 19/006 |
| 2019/0041988 A1* | 2/2019 | Pohl | G06F 3/011 |

OTHER PUBLICATIONS

NPL, Fame Focus: "Amazing Before & After Hollywood VFX—Part1," Jun. 11, 2019, XP 055933568, Retrieved from Internet at URL: https://www.youtube.com/watch?v=JIbbYI77GxM (1:27 to 1:54 [min:sec]) with screenshots.

NPL, Wonder Movies: "Game of Thrones—Visual Effects in Season 7," Sep. 1, 2017, XP 055933598, Retrieved from the Internet at URL: https://www.youtube.com/watch?v =_twjQ43HXHA (3:05 to 3:25 [min:sec]) with screenshots.

* cited by examiner

ADJUSTABLE ROBOT FOR PROVIDING SCALE OF VIRTUAL ASSETS AND IDENTIFYING OBJECTS IN AN INTERACTIVE SCENE

BACKGROUND

Characters in video games are rendered using action sequence data which is generated by recording actors as they perform actions in a real-world performance space. The action sequence data includes data from cameras that record an actor as she performs actions in the real-world performance space, data from sensors which can be worn by the actor as she performs the actions in the performance space, and data from depth sensors and any other sensors situated in the performance space. To render a character in a video game, the action sequence data for a particular action is associated with the rig for the character. The rig is a skeletal data structure for the character which includes, among other things, joints and blend shapes. The result is that the character in the video game will perform the particular action with the same movements, e.g., gait, upper body movements, mannerisms, etc., that the actor used to perform the particular action in the performance space.

The actor performing in the performance space typically performs the actions by herself, and this is especially the case in light of the distancing and other protocols put in place to combat the Covid-19 pandemic. Thus, for actions that involve interacting with another character or object in the video game, e.g., shaking the hand of another character or grabbing a doorknob, the actor must simulate the interaction with the character or object. For example, in the case of shaking the hand of another character, the actor must estimate the location of this character's hand and simulate the handshake at that location. Likewise, in the case of grabbing a doorknob, the actor must estimate the location of the doorknob and simulate the grabbing of the doorknob at that location. This need to simulate interactions in the performance space without a frame of reference can be burdensome to the actor.

Moreover, if the actor's estimate of the location is off by a significant margin, e.g., the actor performs the handshake at a height either significantly above or significantly below the height at which the character's hand appears in the video game, then the action sequence data generated in the performance space will need to be edited to correct the scale of the interaction and thereby make the handshake look proper in the video game. This is undesirable because editing the action sequence data to correct scaling issues is time consuming and thereby significantly increases the production costs associated with the generation of the action sequence data for a video game.

It is in this context that embodiments arise.

SUMMARY

In an example embodiment, a method for generating action sequence data for a character to be rendered in a video game is provided. The method includes, during recording of an actor in a performance space, providing a cue to the actor to perform an action that simulates interacting with a virtual object at a location in the performance space. The method also includes instructing a robot to move to the location in the performance space at which the actor is to simulate interaction with the virtual object, and instructing the robot to adjust a physical attribute of the robot when at the location. The physical attribute of the robot, when adjusted, is placed at a three-dimensional location in the performance space to simulate a scale of the virtual object with which the actor is to simulate interaction.

In one embodiment, the actor corresponds to the character to be rendered in the video game. In one embodiment, the performance space is a real-world space. In one embodiment, the location in the performance space corresponds to a virtual location of the virtual object in a virtual space of the video game, with the real distance in the performance space between the actor and the location being correlated to a virtual distance in the virtual space between the character and the virtual object, and with the changes in the real distance being tracked to cause corresponding changes in the virtual distance.

In one embodiment, the virtual object is an animated object to be rendered in the video game. In one embodiment, the action performed by the actor is one of a handshake with the animated object, a facial expression directed toward the animated object, a motion made by the character in relation to the animated object, a motion of input by the character made to or received from the animated object, or an interactive action made by the character in relation to the animated object.

In one embodiment, the robot includes an adjustable arm to which a prop representing a hand is attached, and the instructing of the robot to adjust the physical attribute of the robot includes instructing the robot to place the prop representing the hand at the three-dimensional location in the performance space that corresponds to an approximate location of an animated object's hand in a virtual space of the video game. In one embodiment, the virtual object represents a physical object in a virtual space.

In another example embodiment, another method for generating action sequence data for a character to be rendered in a video game is provided. The method includes, during recording of an actor in a performance space, providing a cue to the actor to perform an action that simulates interacting with a virtual obstacle at a location in the performance space. The method also includes instructing a robot to move to the location in the performance space at which the actor is to simulate interaction with the virtual obstacle, and instructing the robot to adjust a physical attribute of the robot when at the location. The physical attribute of the robot, when adjusted, is placed at a three-dimensional location to simulate a scale of the virtual obstacle with which the actor is to simulate interaction.

In one embodiment, the actor corresponds to the character to be rendered in the video game. In one embodiment, the performance space is a real-world space. In one embodiment, the location in the performance space corresponds to a virtual location of the virtual obstacle in a virtual space of the video game, with the real distance in the performance space between the actor and the location being correlated to a virtual distance in the virtual space between the character and the virtual obstacle, and with changes in the real distance being tracked to cause corresponding changes in the virtual distance.

In one embodiment, the virtual obstacle is one of an animated object or a non-animated object. In one embodiment, the action performed by the actor is one of going around the animated object or the non-animated object, jumping over the animated object or the non-animated object, climbing over the animated object or the non-animated object, stepping on the animated object or the non-animated object, or an interactive action made by the character in relation to the animated object or the non-animated object.

In one embodiment, the virtual obstacle is a non-animated object, and the non-animated object is one of a table, a fence, a wall, a rock, a game-generated object, or game-generated topography. In one embodiment, the virtual obstacle is an animated object, and the animated object is one of a vehicle, a river, or a game-generated character.

In yet another example embodiment, a computer readable medium containing non-transitory program instructions for generating action sequence data for a character to be rendered in a video game is provided. The execution of the program instructions by one or more processors of a computer system causes the one or more processors to carry out the following operations: during recording of an actor in a performance space, providing a cue to the actor to perform an action that simulates interacting with a virtual object at a location in the performance space; instructing a robot to move to the location in the performance space at which the actor is to simulate interaction with the virtual object; and instructing the robot to adjust a physical attribute of the robot when at the location, the physical attribute when adjusted is placed at a three-dimensional location in the performance space to simulate a scale of the virtual object with which the actor is to simulate interaction.

In one embodiment, the actor corresponds to the character to be rendered in the video game. In one embodiment, the performance space is a real-world space. In one embodiment, the location in the performance space corresponds to a virtual location of the virtual object in a virtual space of the video game, with the real distance in the performance space between the actor and the location being correlated to a virtual distance in the virtual space between the character and the virtual object, and with changes in the real distance being tracked to cause corresponding changes in the virtual distance.

Other aspects and advantages of the disclosures herein will become apparent from the following detailed description, taken in conjunction with the accompanying drawings, which illustrate by way of example the principles of the disclosures.

DETAILED DESCRIPTION

In the following description, numerous specific details are set forth in order to provide a thorough understanding of the example embodiments. However, it will be apparent to one skilled in the art that the example embodiments may be practiced without some of these specific details. In other instances, process operations and implementation details have not been described in detail, if already well known.

Figure 1:
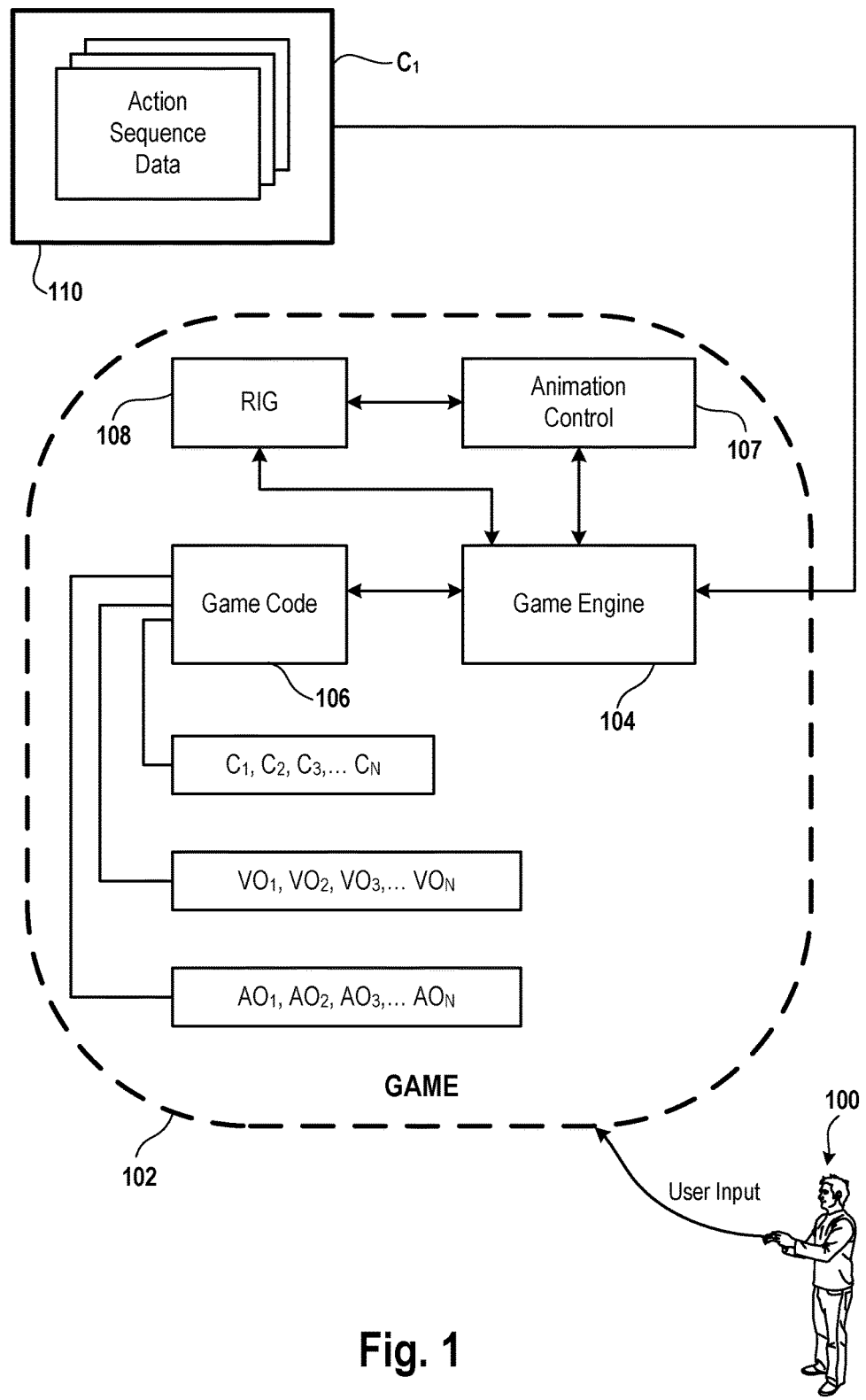
FIG. 1 is a simplified schematic diagram that shows a user playing a video game in which action sequence data is used, in accordance with one embodiment.

FIG. 1 is a simplified schematic diagram that shows a user playing a video game in which action sequence data is used, in accordance with one embodiment. As shown in FIG. 1, user 100 provides user input in the course of playing video game 102. The video game 102 can be implemented in any suitable mode, e.g., console-only mode, online gaming mode, or streaming mode. In console-only mode, the video game 102 is typically executed by the game console from a game disc, e.g., an optical disc. In online gaming mode, the video game 102 is executed by the game console from either a game disc or a downloaded version of the game. Further, in online gaming mode, the console is in communication with an online game server and receives updates regarding other online players via the online game server. In streaming mode, the video game 102 is executed in the cloud by an online game server, which processes the user inputs and transmits video frames back to the user for display on the user's device, e.g., a desktop computer, a laptop computer, a tablet computer, or a smartphone.

In the course of game play, the game engine 104 executes game code 106 and controls all facets of the video game 102 including, by way of example, game physics, lighting, and textures. The game code 106 can include a number of characters, $C_1$, $C_2$, $C_3$, $C_4$, ... $C_N$, that are part of the video game 102. The game code 106 also can include a number of virtual objects, $VO_1$, $VO_2$, $VO_3$, $VO_4$, ... $VO_N$, and a number of animated objects, $AO_1$, $AO_2$, $AO_3$, $AO_4$, ... $AO_N$, that are part of the video game 102. A "virtual object" is not a real object but rather is a computer-generated object. An "animated object" is a virtual object that moves and a "non-animated object" is a virtual object that does not move. By way of example, an "animated object" can represent a vehicle, a river, or a game-generated character and a "non-animated object" can represent a table, a fence, a wall, a rock, a game-generated object, or game-generated topography.

To render a character in the video game 102, the game engine 104 interfaces with animation control 107 and rig 108. Animation control 107 generates movement of rig 108 using action sequence data from action sequence database 110. The action sequence database 110 includes action sequence data for characters in the video game. The action sequence data is generated by recording actors with cameras as they perform actions in a real-world performance space. In some cases, the actors wear sensors as they perform the actions in the performance space. Additional details regarding the generation of the action sequence data are described below with reference to FIG. 2.

The rig 108, which is a skeletal data structure for the character to be rendered, includes, among other things, bones, joints, and blend shapes for faces. By way of example, if the game code 106 specifies that character $C_1$ is to execute a punch move on another game character, e.g., a monster, the game engine 104 will pull the action sequence data for a punch move by character $C_1$ from action sequence database 110. The game engine 104 also will instruct animation control 107 and rig 108 to associate the rig for character $C_1$ with the action sequence data for a punch move by character $C_1$. Ultimately, the game engine 104 will render character $C_1$ executing the punch move on the monster in the video game 102. As the result of the use of the action sequence data, the character $C_1$ will perform the punch move on the monster in the video game 102 with the same movements, e.g., gait, upper body movements, mannerisms, etc., that the actor representing character $C_1$ used to perform the punch move in the performance space.

Figure 2:
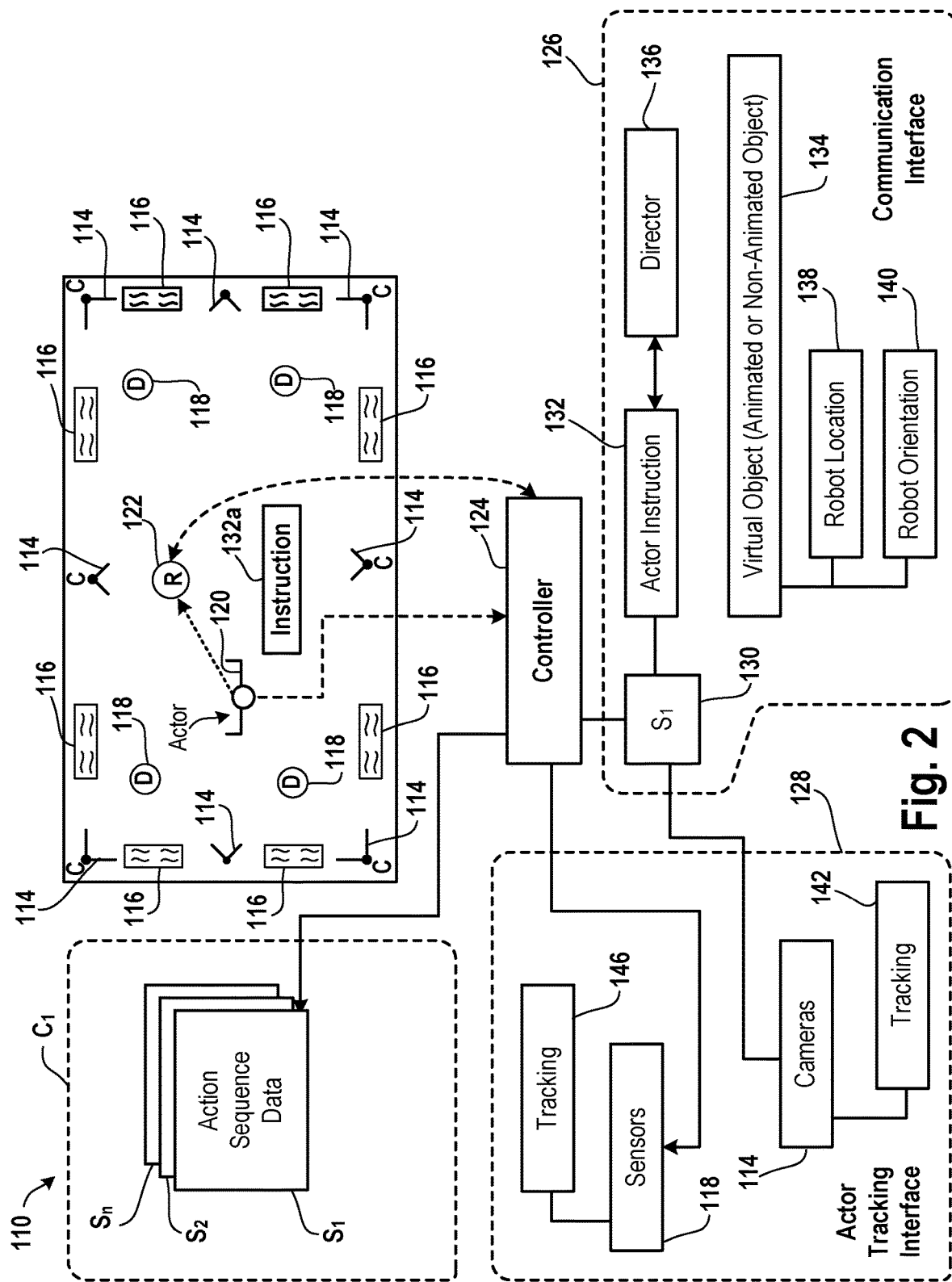
FIG. 2 is a simplified schematic diagram that illustrates the generation of action sequence data in a real-world performance space, in accordance with one embodiment.

FIG. 2 is a simplified schematic diagram that illustrates the generation of action sequence data in a real-world performance space, in accordance with one embodiment. As shown in FIG. 2, real-world performance space 112 includes a plurality of cameras 114 situated around the periphery of the performance space. In some embodiments, however, the actor 120 can be recorded using just one camera 114. In one embodiment, the cameras 114 include standard RGB (red, green, blue) cameras, which provide two-dimensional images as a grid of pixels with associated RGB values, and/or depth cameras, which provide images that include pixels having an additional numerical value associated with them, with that additional value being the distance from the camera, or "depth." A number of display screens 116 also are situated around the periphery of performance space 112. By way of example, the display screens 116 can be used as monitors to display video or as teleprompters to display, e.g., instructions for an actor. On an optional basis, the performance space 112 also can include a number of depth sensors 118 disposed around the interior of the performance space. The depth sensors 118 can be used to determine the three-dimensional positioning of an actor 120, as will be described in more detail below.

An actor 120 performs actions within the performance space 112, as will be described in more detail below. The actions are associated with scenes that can appear in the video game and the actor 120 represents a character, e.g., character $C_1$, that is part of the video game. In some embodiments, the actor 120 optionally wears either markers or sensors while she performs the actions in the performance space 112. In embodiments in which the actor 120 wears markers, the markers can be either two-dimensional disks or three-dimensional spheres which are mounted all over her body (e.g., head, arms, legs, torso, feet, etc.) while she performs the actions. Generally speaking, the markers make it easier to ascertain the three-dimensional movement of actor 120. In embodiments in which the actor 120 wears sensors, the sensors can be motion/inertial sensors which transmit data via a suitable wireless communication protocol, e.g., Bluetooth, to a receiver. In one embodiment, the receiver is part of a controller for the performance space 112, e.g., controller 124, which is described in more detail below. To provide the actor with a frame of reference while she performs the actions, robot 122 is maneuvered to specific locations within the performance space 112. Additional details regarding the functionality of robot 122 are set forth below.

The performance space 112 further includes controller 124, which can be any computer (or computers) used for managing communication with actor 120, robot 122, depth sensors 118, and other devices, e.g., sensors, computing devices, and the like, in the performance space 112. The controller 124 can include hardware and software and is capable of processing instructions. In some embodiments, the processing capability of controller 124 is embodied as part of one or more servers, which can be either local or part of a remote network, e.g., a data center or a cloud system. In one embodiment, controller 124 is a local computer, e.g., a desktop computer, a laptop computer, or a tablet computer, which is physically located in or proximate to the performance space 112. In another embodiment, controller 124 is a remote computer, e.g., a networked computer such as a server, which is part of a data center or a cloud system. User interfaces for the controller 124 can be accessed using mobile devices, e.g., smartphones, tablet computers, and laptop computers. In one embodiment, controller 124 communicates with communication interface 126 and actor tracking interface 128.

The communication interface 126 enables the controller 124 to receive instructions for the recording of a scene, e.g., scene $S_1$, of the video game 102. The instructions 130 for a scene, e.g., scene $S_1$, include actor instructions 132 and virtual object instructions 134. The actor instructions 132 can include the actions to be performed by the actor 120 in scene $S_1$ according to a script for that scene. In one embodiment, the controller 124 transmits the actor instructions 132 to display screens 116 so that the actor 120 can read the actor instructions on the display screens. The actor instructions 132 can also include cues, instructions, notes, comments, and the like from a director 136. In one embodiment, the controller 124 transmits audio instructions 132a from director 136 to the actor 120 using a suitable wireless protocol, e.g., Bluetooth. In one embodiment, the actor 120 receives the audio instructions 132a from the director 136 via an earpiece, e.g., an in-ear monitor (IEM).

The virtual object instructions 134 can include instructions regarding the robot location 138 and the robot orientation 140 for a scene, e.g., scene $S_1$. The instructions regarding the robot location 138 instruct the robot 122 to move to a specific location for scene $S_1$. The instructions regarding the robot orientation 140 instruct the robot to assume a specific configuration for scene $S_1$, as will be described in more detail below. The controller 124 can transmit the virtual object instructions 134 to the robot 122 using any suitable wireless communication protocol. In one embodiment, the robot 122 includes a robot controller for processing the virtual object instructions 134. The robot controller for the robot 122 can be implemented as either hardware, software, or a combination of hardware and software.

The actor tracking interface 128 enables the controller 124 to receive data from cameras 114 and any optional depth sensors 118 situated in the performance space 112. In one embodiment, the controller 124 includes a receiver for receiving data from, e.g., cameras 114 and depth sensors 118. The data from cameras 114 can yield tracking data 142 and the data from depth sensors 118 can yield tracking data 146. The tracking data 142 from cameras 114 can include data taken from one or more cameras recording the actions being performed by the actor 120. In some embodiments, the tracking data 142 includes data from a single camera 114, which can be either a depth camera or a RGB camera. In some embodiments, the tracking data 142 includes data from a plurality of cameras 114, which can be depth cameras, RGB cameras, or a combination of both depth and RGB cameras, so that the data includes multiple video feeds taken at different angles relative to the actor 120. When the data includes multiple video feeds, the data from the multiple video feeds can be combined and synthesized using machine learning algorithms to generate a three-dimensional view of actor 120 for positioning and tracking purposes.

The tracking data 146 can include data taken from one or more depth sensors 118 as the actor 120 performs the actions in the performance space 112. It is to be understood that the use of tracking data 146 is optional because the tracking data 142 obtained from cameras 114 is usually sufficient to generate the action sequence data for a video game. In embodiments in which depth sensors 118 are used, the use of multiple depth sensors essentially combines depth data from different viewpoints and thereby provides the three-dimensional tracking capability reflected in tracking data 146. By way of example, the three-dimensional positioning of an actor's limbs can be determined by using data from the depth sensors 118 to ascertain how far the actor is reaching out from her torso with her limbs.

With continuing reference to FIG. 2, in the example in which the actor 120 represents character $C_1$ in the video game, the generation of action sequence data for a scene $S_1$ in which character $C_1$ performs a punch move on a monster can include the following operations. The controller 124 receives instructions 130 for scene $S_1$ and transmits the actor instructions 132 to actor 120 via display screens 116 so that the actor can read the instructions on the display screens. The instructions 132 instruct the actor 120 to move to the location of the monster and to perform a punch move on the monster. The controller 124 also transmits virtual object instructions 134 to robot 122. The virtual object instructions 134 include instructions regarding robot location 138, which instruct the robot 122 to move to a location in the performance space 112 which corresponds to the location at which the actor 120 is to perform the punch move on the monster. The robot controller for robot 122 processes the instructions regarding robot location 138 and causes the robot to begin moving to the specified location in the performance space 112. At the time the actor 120 needs to start moving to get to the specified location in the performance space 112 at the right time, the director 136 issues audio instructions 132a to the actor 120 and the controller 124 wirelessly transmits the audio instructions to the actor. In one embodiment, the audio instructions 132a from the director 136 cue the actor 120 to "Move now!"

Upon receipt of the audio instructions 132a via her in-ear monitor (IEM), the actor 120 starts moving toward the location of the monster, as indicated by the dashed arrow 148 in FIG. 2. As the robot 122 moves toward the specified location in the performance space 112, the robot controller for the robot processes the instructions regarding robot orientation 140, which are part of the virtual object instructions 134, and causes the robot to assume a configuration that corresponds to the scale of the monster in the video game. Additional details regarding the configuration assumed by robot 122 are set forth below with reference to FIGS. 3A-3E, 4A, and 4F. When the actor 120 reaches the location of the monster (namely, the location of the robot 122 in the performance space 112), the actor performs the punch move on the monster using the robot as a frame of reference. In particular, because the robot has assumed a configuration that corresponds to the scale of the monster in the video game, the actor 122 can perform the punch move so that she strikes the monster at the proper height, e.g., the monster's midsection. Additionally, the actor 122 can make eye contact with the monster at the appropriate level by focusing on the portion of the robot 122 that corresponds to the monster's face, e.g., a faceplate as will be described in more detail below with reference to FIGS. 3C-3E, 4A, and 4F. As such, the frame of reference provided by the robot 122 enables the actor 120 to perform the punch move on the monster at the appropriate scale and thereby obviates the need to edit the action sequence data to correct significant scaling issues.

Once the actor 120 has performed the punch move on the monster and scene $S_1$ is finished, the controller 124 gathers the data captured by the cameras 114 and the sensors 118 as the punch move was being performed so that this data can be processed to generate action sequence data suitable for use in the video game. As described herein, the inputs into the controller 124 can include data from depth sensors, RGB cameras, depth cameras, motion/inertial sensors, and combinations thereof. By way of example, the inputs for tracking the actor 120 can include only cameras, only depth sensors, both cameras and depth sensors, multiple types of cameras, e.g., RGB cameras and depth cameras, or even just a single camera. In some embodiments, the controller 124 processes data from multiple systems, e.g., multiple depth sensors with one or more cameras or multiple cameras with one or more depth sensors, to blend the data from each of the multiple systems together using machine learning algorithms. By way of example, using machine learning, the data from multiple depth sensors 118 can be combined to identify the location and positioning of the actor 120. Similarly, using machine learning, data from multiple cameras 114, which are disposed at different angles relative to the actor 120, can be combined and the multiple video feeds can be synthesized to formulate a three-dimensional view of the actor for purposes of positioning. Machine learning algorithms can then be used to fine tune the tracking results obtained from the multiple systems, e.g., the depth sensors and the cameras, to formulate a blended three-dimensional view of the actor for purposes of positioning that is suitable for use in the video game. In some embodiments, it might be necessary to make some manual edits to the blended three-dimensional view of the actor to correct flaws which do not involve scaling issues to obtain action sequence data that is suitable for use in the video game.

Once the action sequence data for scene $S_1$ has been generated, the controller 124 stores this action sequence data to action sequence database 110. In one embodiment, the action sequence data is stored to the section of action sequence database 110 which contains the action sequence data for character $C_1$. In one embodiment, the action sequence data is stored in the action sequence database 110 in the form of files, sub-files, and the like. It should be appreciated that the action sequence data for other scenes involving character $C_1$, e.g., scenes $S_2$, $S_3$, . . . $S_N$, also can be stored in the section of the action sequence database 110 for character $C_1$. In one embodiment, the action sequence database 110 includes sections for each of the characters in the video game, e.g., characters $C_1$, $C_2$, $C_3$, $C_4$, . . . $C_N$.

Figure 3A:
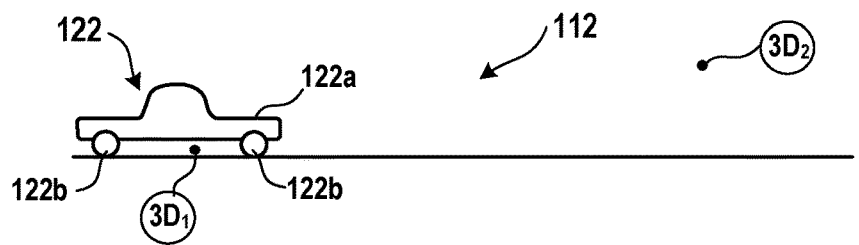
FIGS. 3A-3E illustrate the use of a robot to provide an actor with a frame of reference as the actor performs actions in a performance space, in accordance with one embodiment.

FIGS. 3A-3E illustrate the use of a robot to provide an actor with a frame of reference as the actor performs actions in a performance space, in accordance with one embodiment. As shown in FIG. 3A, robot 122 includes a robot base 122a and robot wheels 112b. The robot base 122a houses the mechanical and electronic components needed to enable the robot 122 to receive and process instructions and to move to different locations in the performance space 112 in response to the instructions. In one embodiment, the robot base 122a houses, among other components, an electric motor and a robot controller (not shown). As shown in FIG. 3A, robot 122 is situated over a three-dimensional location, $3D_1$, in the performance space 112. In one embodiment, the three-dimensional location, 3D1, includes a location having the coordinates $(X_1, Y_1, Z_1)$. Another three-dimensional location, 3D$_2$, in the performance space 112 also is shown in FIG. 3A. In one embodiment, the three-dimensional location, 3D$_2$, includes a location having the coordinates $(X_2, Y_2, Z_2)$. In one embodiment, robot 122 receives instructions to provide a frame of reference for an actor 120 (see, e.g., FIG. 3B) who will soon be performing an action in the performance space 112 to simulate interaction with a virtual object in a video game.

Figure 3B:
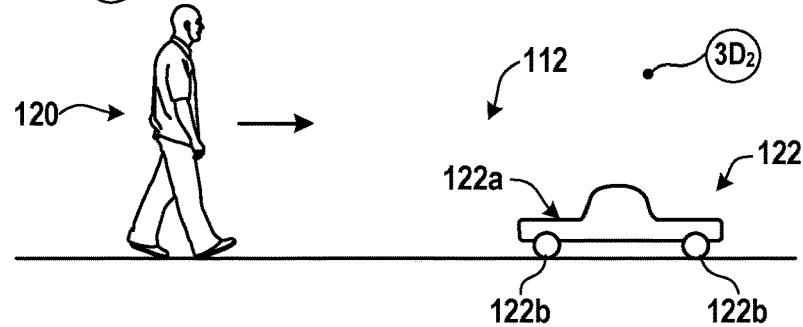
Figure 3C:
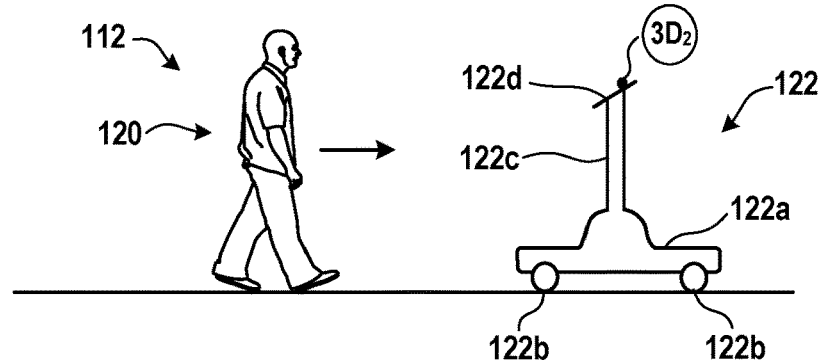

FIG. 3B shows the robot 122 after the robot has moved to a specified location in the performance space 112. In one embodiment, the specified location to which the robot 122 has moved corresponds to the location at which the actor 120 is to perform the action to simulate interaction with the virtual object. As shown in FIG. 3B, the actor 120 has been provided with a cue to perform the action and, in response to the cue, has started moving toward the specified location in the performance space. In one embodiment, as the actor 120 approaches the robot 122, which is located at the specified location in the performance space 112, the robot receives instructions to adjust a physical attribute of the robot to simulate the scale of the virtual object. As shown in FIG. 3C, the height of the robot 122 has been adjusted by extending telescoping members 122c upwardly from within robot base 122a so that the top of the telescoping members 122c is placed at the three-dimensional location, 3D$_2$, in the performance space 112. In one embodiment, the virtual object is a character in the video game, e.g., a monster, and the monster has a height that defines an eye level that occurs at a height of about Y$_2$ in three-dimensional space. As such, the three-dimensional location, 3D$_2$, which includes a location having the coordinates $(X_2, Y_2, Z_2)$, simulates the scale of the monster in the video game. In one embodiment, as shown in FIG. 3C, a robot faceplate 122d has been provided at the top of the telescoping members 122c. The robot faceplate 122d provides the actor 120 with a more robust area to make eye contact with while simulating the interaction with the virtual object, e.g., the monster. In one embodiment, the robot faceplate 122d is a cardboard cutout that resembles the virtual object, e.g., a cardboard cutout of the monster's head or facial area. In another embodiment, the robot faceplate 122d is a tablet device, e.g., a tablet computer or a tablet display screen, which electronically displays a resemblance of the virtual object, e.g., an electronic image of the monster's head or facial area.

Figure 3D:
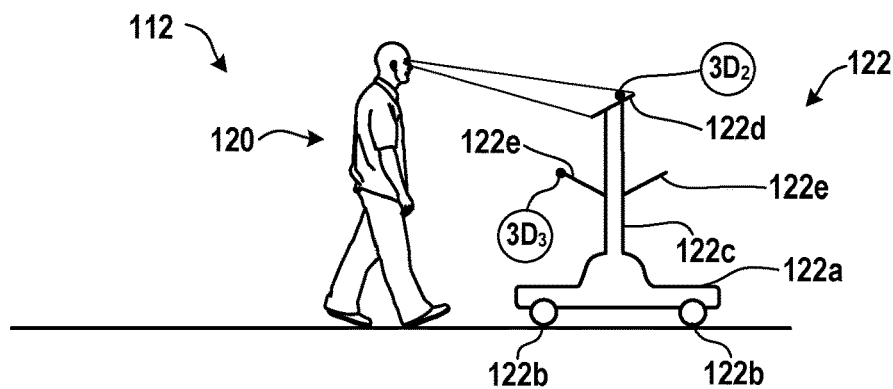

FIG. 3D shows the actor 120 as she continues to move toward the specification in the performance space 112. As shown in FIG. 3D, the actor 120 has nearly reached the robot 122. As the actor 120 approaches the robot 122, the actor can make eye contact with the robot faceplate 122d provided on the telescoping members 122c of the robot. Thus, the use of the robot faceplate 122d provides the actor 120 with a frame of reference for her simulated interaction with the virtual object. Further, as the robot faceplate 122d simulates the scale of the virtual object, e.g., the eye level of the monster, the robot faceplate ensures that the actor 120 will be looking at the virtual object at the proper angle, e.g., focusing eye contact at the proper level, during the simulated interaction with the virtual object. This avoids the need to edit the action sequence data to correct any scaling issues associated with the angle at which the actor 120 is looking at the virtual object during the simulated interaction with the virtual object.

Figure 3E:
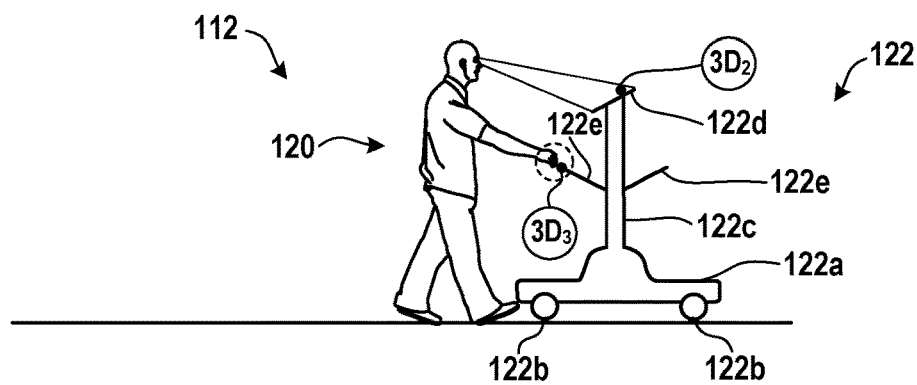

In some embodiments, more than one physical attribute of the robot 122 can be adjusted to provide the actor 120 with a frame of reference for simulating interaction with the virtual object. As shown in FIG. 3D, robot arms 122e have been extended away from telescoping members 122c. In one embodiment, in response to instructions received by the robot 122, the end of one of the robot arms 122e is placed at a three-dimensional location, 3D$_3$, in the performance space 112. In one embodiment, the three-dimensional location, 3D$_3$, includes a location having the coordinates $(X_3, Y_3, Z_3)$. The three-dimensional location, 3D$_3$, can be selected to correspond to the location of a virtual object in the video game so as to provide the actor 120 with a frame of reference for simulating interaction with the virtual object. As shown in FIG. 3E, the actor 120 has arrived at the specified location in the performance space 112 and is simulating an interaction with the virtual object using three-dimensional location, 3D$_3$, which is placed at the end of one of the robot arms 122e, as a frame of reference. To highlight the location of the end of the robot arm 122e, in one embodiment, one or more light emitting diodes (LEDs) is provided at the end of the robot arm. To provide a cue to the actor, the LEDs can emit a colored light, e.g., red light, or can be set to blink or flash. In one embodiment, the virtual object is a monster in the video game and the actor 120 is simulating a handshake with the monster in the region proximate to three-dimensional location, 3D$_3$. In this embodiment, the three-dimensional location, 3D$_3$, is selected to correspond to the location at which the monster's hand will appear in the video game. This ensures that the actor 120 will be simulating the handshake at the proper location and thereby avoids the needs to edit the action sequence data to correct any scaling issues associated with the height or other relative positioning of the simulated handshake with the virtual object. In one embodiment, a prop representing a hand is attached to the end of one of the robot arms 122e. It should be appreciated by those skilled in the art that the robot arms 122e can be used to provide a frame of reference for the actor 120 to simulate other interactions with a virtual object. By way of example, the robot arms 122e can be used to provide a frame of reference for a door handle (to simulate the opening of a door) or for a cup (to simulate taking a drink from a cup). Additionally, the robot arms 122e can be used to provide a frame of reference for a virtual obstacle. By way of example, the virtual obstacle can be a non-animated object such as a table, a fence, a wall, a rock, a game-generated object, or game-generated topography or an animated object such as a vehicle, a river, or a game-generated character.

Figure 4A:
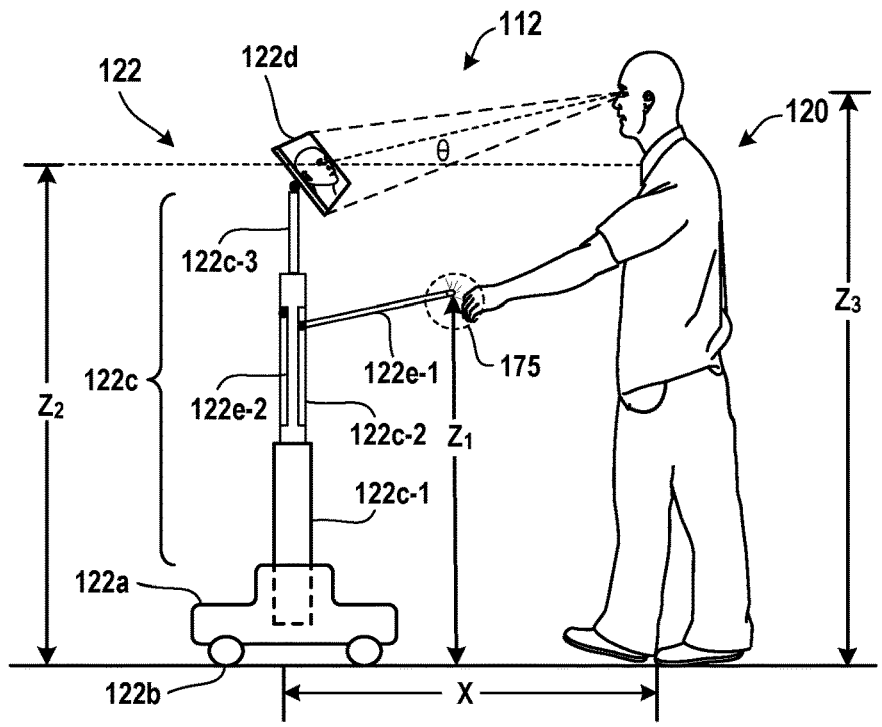
FIG. 4A illustrates an actor using a robot to provide a frame of reference to simulate an interaction with a virtual object, in accordance with one embodiment.
Figure 4B:
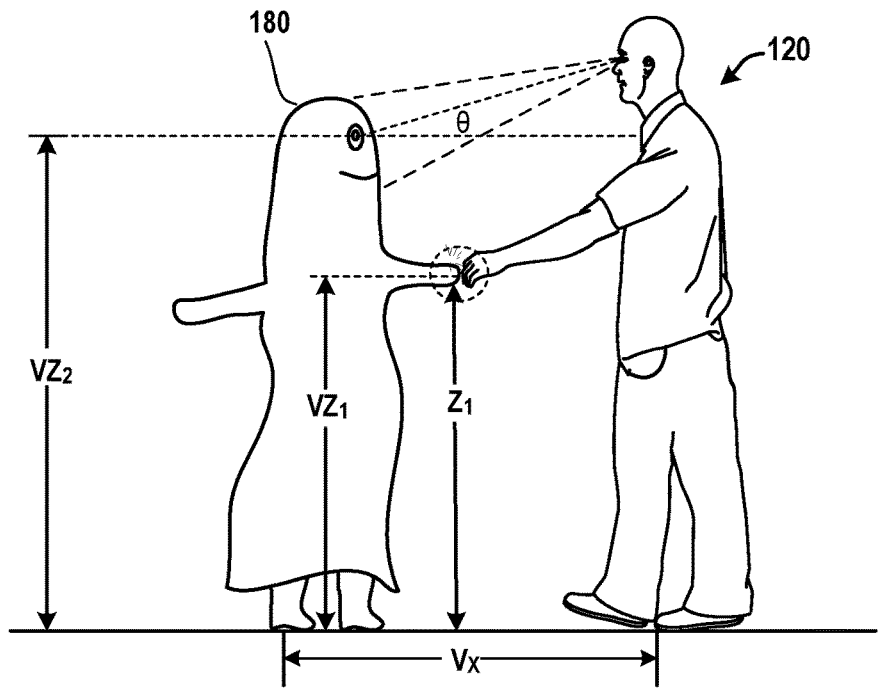
FIG. 4B is a hybrid illustration that shows an actor from a real-world performance space in relation to a virtual object in a video game.

FIG. 4A illustrates an actor using a robot to provide a frame of reference to simulate an interaction with a virtual object, in accordance with one embodiment. As shown in FIG. 4A, actor 120, who is performing in real-world performance space 112, is using robot 122 to simulate a handshake with a virtual object, e.g., a monster as shown in FIG. 4B. The robot 122 includes a number of telescoping members 122c, which include telescoping member 122c-1, telescoping member 122c-2, and telescoping member 122c-3. The telescoping members 122c, which are at least partially housed in robot base 122a when lowered into a nested position, can be extended upwardly from the robot base, e.g., as shown in FIG. 4A. In one embodiment, telescoping member 122c-2 includes a first slot in which robot arm 122e-1 is movably disposed and a second slot in which robot arm 122e-2 is movably disposed. As shown in FIG. 4A, robot arm 122e-1 has been pivoted away from telescoping member 122c-2 so that the distal end of the robot arm 122e-1 defines a height which is slightly higher than the height defined by the proximal end, which is movably attached to the telescoping member 122c-2. The robot 122 also includes a robot faceplate 122d, which, in one embodiment, is pivotably disposed on telescoping member 122c-3. In one embodiment, robot faceplate 122d is a display device, e.g., a tablet computer or a tablet display screen, on which an electronic image of a virtual object is displayed. In one embodiment in which the virtual object is a monster in a video game, the electronic image shows the head or facial area of the monster.

As shown in FIG. 4A, the robot 122 is configured so that the distal end of robot arm 122e-1 defines a first height, $Z_1$, and a center region of the faceplate 122d defines a second height, $Z_2$. In one embodiment, the first height, $Z_1$, corresponds to the height of the monster's hand (or arm) when extended for a handshake and the second height, $Z_2$, corresponds to the height defined by the monster's eye level, as will be described in more detail below with reference to FIG. 4B. A third height, $Z_3$, is defined by the eye level of actor 120. In addition, as shown in FIG. 4A, the distance, X, defines the distance between the robot 122 and the actor 120, with this distance being measured from the approximate center of the robot to the approximate center of the actor.

In one embodiment, as the actor 120 approaches the robot 122 during his performance in the real-world performance space 112, the actor can make eye contact with the robot faceplate 122d, the center of which is situated at height, $Z_2$, which corresponds to the eye level of the monster. As shown in FIG. 4A, the actor 120 is taller than the height defined by the approximate center of the faceplate 122d. In this scenario, when the actor 120 makes eye contact with the faceplate 122d, the actor's line of sight defines an angle, θ, relative to a horizontal line, as will explained in more detail below with reference to FIGS. 4C-4E. To simulate the handshake with the virtual object, e.g., the monster, the actor 120 can reach out with his hand and execute a shaking motion in the three-dimensional location 175 surrounding the distal end of robot arm 122e-1. In one embodiment, the three-dimensional location 175 defines a three-dimensional volume which can have a spherical shape, a spheroidal shape, or an ellipsoidal shape.

FIG. 4B is a hybrid illustration that shows an actor from a real-world performance space in relation to a virtual object, e.g., a monster, from a video game (a virtual space). The actor 120 shown in FIG. 4B corresponds to the actor 120 shown in FIG. 4A. Those skilled in the art will recognize that actor 120 does not appear in the video game, but rather is used to generate action sequence data for a character, e.g., character $C_1$, in the video game. The virtual distance, $V_X$, defines the distance between the actor 120 and the monster 180. The virtual distance, $V_X$, can be varied from the real-world distance, X, which is shown in FIG. 4A, to ensure that the interaction between character $C_1$ and the monster 180 in the video game appears realistic. The hybrid illustration of FIG. 4B is presented to illustrate how the use of the robot 122 to provide a frame of reference for an actor 122 performing actions in a real-world performance space to generate action sequence data avoids scaling issues when the actor simulates interactions with a virtual object. As can be seen in FIG. 4B, the actor 120 is making eye contact with the monster 180 at the proper level because $Z_2$, the height of the center of the faceplate 122d (see FIG. 4A), corresponds to virtual height, $VZ_2$, which is the virtual eye level for monster 180. Further, the actor 120 is simulating the handshake with the monster 180 at the appropriate level because $Z_1$, the height of the distal end of robot arm 122e-1 (see FIG. 4A), corresponds to the virtual height, $VZ_1$, which is virtual level for the hand (or arm) of the monster 180.

Figure 4C:
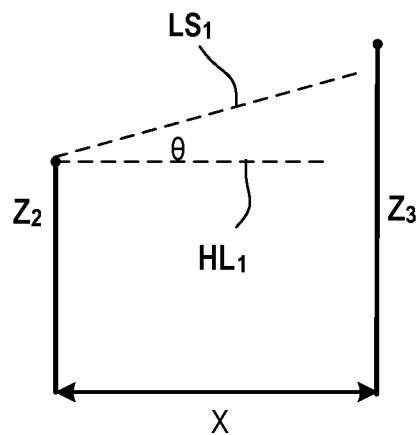
FIGS. 4C-4E illustrate additional details regarding the angle defined when the actor makes eye contact with the robot faceplate of the robot, in accordance with one embodiment.
Figure 4D:
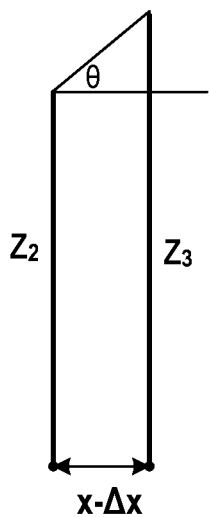
Figure 4E:
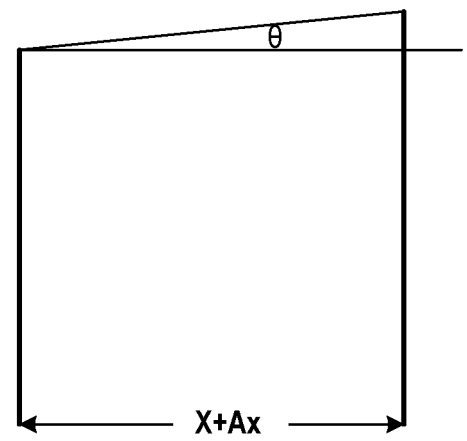

FIGS. 4C-4E illustrate additional details regarding the angle, θ, which is defined when the actor 120 makes eye contact with the robot faceplate 122d of the robot 122, in accordance with one embodiment. FIG. 4C shows the angle, angle, θ, for the embodiment shown in FIG. 4A in which the actor 120 and the robot 122 are separated by the distance, X. As shown in FIG. 4C (and as can be seen in FIG. 4A), the height, $Z_3$, which corresponds to the eye level of the actor 120 (see FIG. 4A), is greater than the height, $Z_2$, which corresponds to the height of the robot faceplate 122d (and the eye level of the monster 180 shown in FIG. 4B). As such, the actor's line of sight, which is indicated by the dashed line $LS_1$ in FIG. 4C, extends in a downward direction and defines the angle, θ, relative to a horizontal line, which is indicated by the dashed line $HL_1$ in FIG. 4C. FIG. 4D shows the angle, θ, when the distance between the actor and the robot is reduced by an amount, e.g., ΔX, so that the distance between the actor and the robot is (X−ΔX). FIG. 4E shows the angle, θ, when the distance between the actor and the robot is increased by an amount, e.g., ΔX, so that the distance between the actor and the robot is (X+ΔX). As can be seen by comparing FIGS. 4D and 4E, the angle, θ, increases as the distance between the actor and the robot decreases.

Figure 4F:
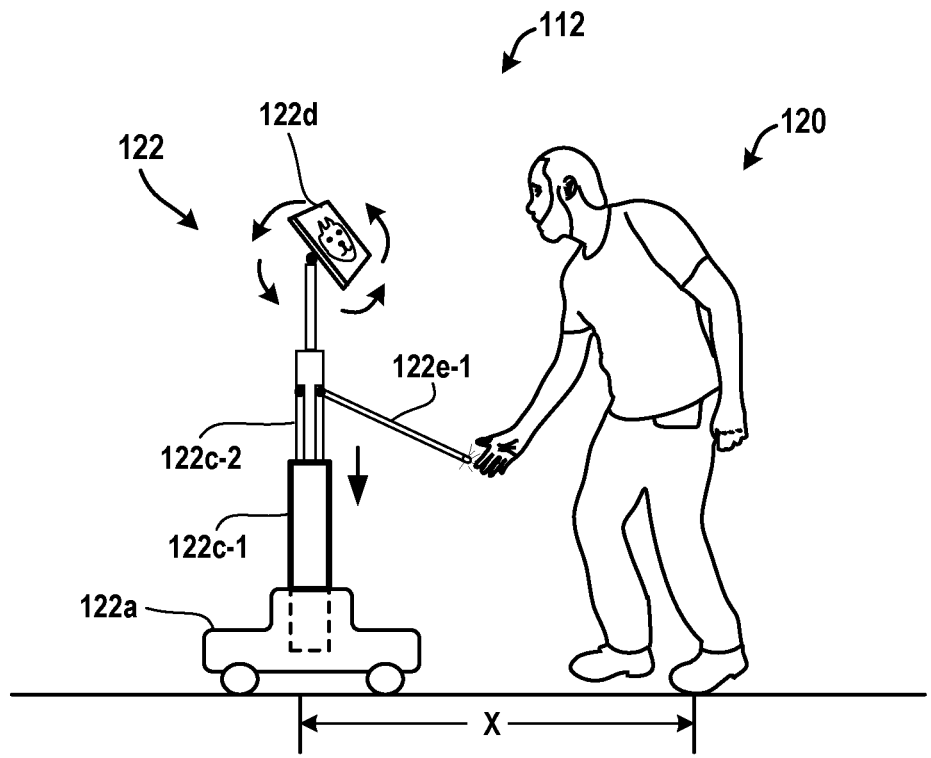
FIG. 4F illustrates an actor using a robot to provide a frame of reference to simulate an interaction with a relatively short virtual object, in accordance with one embodiment.
Figure 4G:
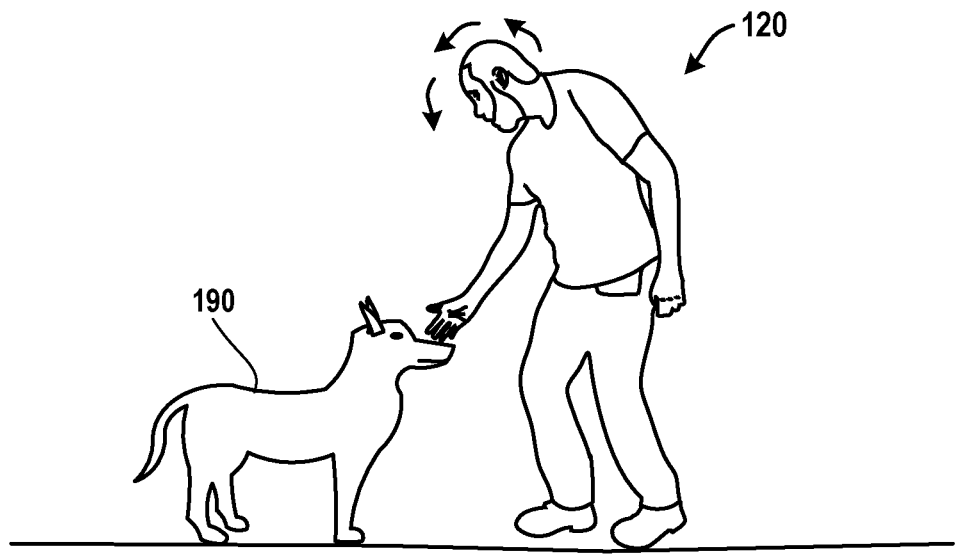
FIG. 4G is a hybrid illustration that shows an actor from a real-world performance space in relation to a virtual object from a video game.

FIG. 4F illustrates an actor using a robot to provide a frame of reference to simulate an interaction with a relatively short virtual object, in accordance with one embodiment. As shown in FIG. 4F, actor 120, who is performing in real-world performance space 112, is using robot 122 to simulate an interaction with a virtual object, e.g., petting a dog as shown in FIG. 4G. As shown in FIG. 4F, robot arm 122e-1 has been pivoted away from telescoping member 122c-2 so that the distal end of the robot arm 122e-1 defines a height which is below the height defined by the proximal end of the robot arm, which is attached to telescoping member 122c-2.

To simulate the interaction with the virtual object, e.g., petting a dog, the actor 120 can reach out with his hand and execute a petting motion in the three-dimensional location surrounding the distal end of robot arm 122e-1. In some embodiments, and as shown in FIG. 4F, it might be necessary for the actor 120 to assume a crouching stance to enable him to execute the petting motion in the three-dimensional location surrounding the distal end of the robot arm 122e-1. In the embodiment of FIG. 4F, the robot faceplate 122d is situated above the distal end of the robot arm 122e-1 due to the configuration of the telescoping members of the robot. To prompt the actor 120 to make proper eye contact with a relatively short virtual object, e.g., the dog, the top part of the robot faceplate 122d can be rotated away from the actor, as indicated by the arrows in FIG. 4F. This positioning of the robot faceplate 122d will cause the actor 120 to have to move his head and neck in a downward direction to see the electronic image of the dog's head or facial area displayed on the robot faceplate.

FIG. 4G is a hybrid illustration that shows an actor from a real-world performance space in relation to a virtual object, e.g., a dog, from a video game (a virtual space). The actor 120 shown in FIG. 4G corresponds to the actor 120 shown in FIG. 4F. Those skilled in the art will recognize that actor 120 does not appear in the video game, but rather is used to generate action sequence data for a character, e.g., character $C_1$, in the video game. As noted above with reference to FIG. 4B, the hybrid illustration of FIG. 4G is presented to illustrate how the use of the robot 122 to provide a frame of reference for an actor 122 performing actions in a real-world performance space to generate action sequence data avoids scaling issues when the actor simulates interactions with a virtual object. As can be seen in FIG. 4G, the actor 120 is making eye contact with the dog 190 at the proper level because, as indicated by the arrows in FIG. 4G, the actor has moved his head and neck in a downward direction in response to the rotation of the robot faceplate 122d (see FIG. 4F). Further, the actor 120 is simulating the petting of the dog 190 at the appropriate level because the height of the distal end of robot arm 122e-1 (see FIG. 4F) corresponds to the virtual height of the head (or facial area) of the dog 190.

In the embodiments described herein, a robot having a specific configuration is used. It will be apparent to those skilled in the art that the configuration of the robot can be varied to meet the needs of particular applications. By way of example, the robot can be embodied as a disk on the floor, with the disk being provided with telescoping capability to move an inner apparatus up and down. The robot can also include a general-purpose rig to which different things could be attached, depending on the requirements for a particular scene. For example, a display and speakers can be attached to the general-purpose rig to represent virtual actors. Additionally, physical props can be attached to the general-purpose rig, e.g., a prop representing a hand can be provided for simulated handshaking or other physical prop interaction. Further, other items can be attached to the general-purpose rig to cue an actor on where to look or interact with a virtual character. For example, one or more light emitting diodes (LEDs) can be used to cue an actor, e.g., by either turning the LEDs on or having the LEDs start blinking. The robot can also be used to represent another actor, e.g., an actor at a remote location. Still further, a computer can be used to handle scaling to determine the height for a prop, e.g., a hand, relative to the real-life height of an actor, to ensure that simulated interactions are done at the actor's real-life scale.

Figure 5:
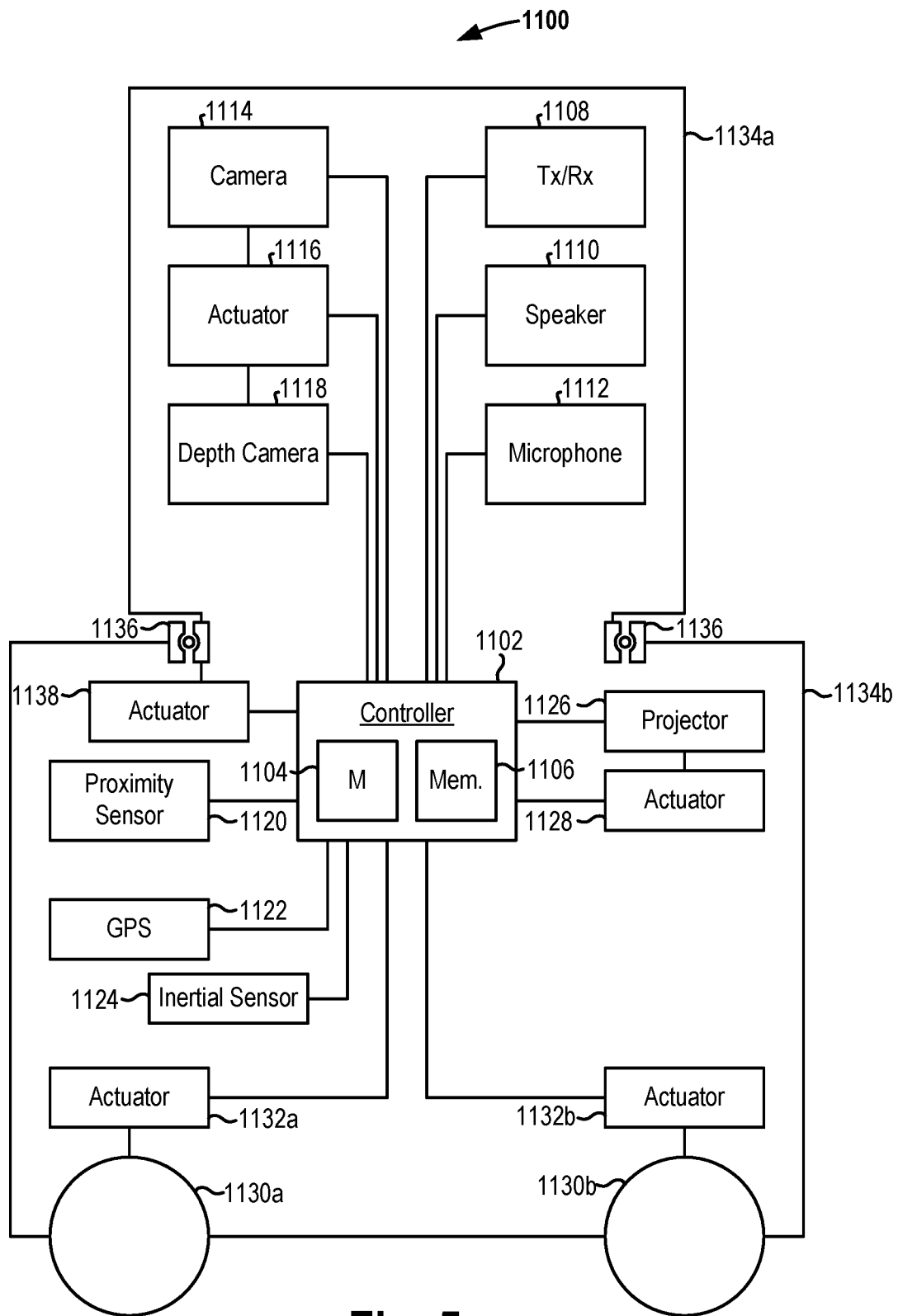
FIG. 5 is a schematic diagram conceptually illustrating components of a robot, in accordance with implementations of the disclosure.

In the embodiments described herein, a robot is used in connection with the generation of action sequence data for a video game. In some embodiments, the robot can have some or all of the features shown in FIG. 5, which is a schematic diagram conceptually illustrating components of a robot, in accordance with implementations of the disclosure. As shown, the robot 1100 includes a controller 1102 that is configured to control various devices of the robot and the operations performed by the robot 1100, including processing data and instructions, and issuing commands to various devices of the robot 1100 to cause the robot to move, capture images/audio/video, render images/audio/video, or perform any other function of which the robot is capable, as described in the present disclosure. The controller 1102 includes one or more processors 1104 (e.g. microprocessor, general purpose processor (GPP), application specific processor (ASP), central processing unit (CPU), graphics processing unit (GPU), complex instruction set computer (CISC), reduced instruction set computer (RISC), application specific integrated circuit (ASIC), digital signal processor (DSP), etc.) configured to execute program instructions, and one or more memory devices 1106 (e.g. volatile memory, non-volatile memory, random access memory (RAM), read-only memory (ROM), SRAM, DRAM, flash memory, magnetic memory, hard disk, optical disc, etc.) configured to store and retrieve data.

A transceiver 1108 is configured to transmit and/or receive data, via a wireless or wired connection. The transceiver 1108 may communicate over one or more networks and use any of various data communications protocols known in the art, including by way of example without limitation, IP-based protocols, Wi-Fi, Bluetooth, NFC, Zigbee, Z-Wave, ANT, UWB, Wireless USB, Sigfox, cellular networks (2G/3G/4G/5G networks, LTE networks, etc.), infrared protocols (e.g. IRDA protocols), etc.

The robot 1100 includes one or more speakers 1110 that are capable of emitting any kind of audio, including by way of example without limitation, sounds from a virtual environment being rendered by the robot 1100, music, speech, audio from a media presentation (e.g. television program, movie, show, etc.), etc.

The robot 1100 includes one or more microphones 1112, which are configured to capture sound from the local environment in which the robot is disposed. A plurality of microphones may permit greater sensitivity in a greater number of directions simultaneously. In some implementations, the microphones 1112 are configured in an array or other predefined positioning arrangement, so that signals from the microphone array can be analyzed to determine directionality of audio sources relative to the microphone array.

The robot 1100 includes one or more image capture devices/cameras 1114 configured to capture images/video from the local environment. Multiple image capture devices can be employed to enable simultaneous coverage of a larger region or multiple regions of the local environment and/or improved environment mapping, depth analysis, by way of example without limitation.

The one or more cameras 1114 can be directed by one or more actuators 1116, to enable the direction of a given camera to be adjusted. Actuators 1116 can be configured to rotate, translate, raise, lower, tilt, pan, or otherwise move or change the orientation of the cameras 1114.

The robot 1100 includes one or more depth cameras 1118. A depth camera is capable of capturing depth/ranging information about objects in the local environment. In some implementations, the depth camera 1118 is a time-of-flight camera that determines distance based on the time-of-flight of a controlled light signal to various points in the local environment.

Similar to the cameras 1114, the depth cameras 1118 can be directed by one or more actuators 1116, which may be the same or different actuators as those that direct the one or more cameras 1114.

The robot 1100 includes one or more proximity sensors 1120, which are capable of detecting proximity of the robot to nearby objects. The proximity sensors 1120 can be mounted at various locations on the robot 1100, to enable proximity detection for corresponding portions of the robot 1100. For example, in some implementations, at least one proximity sensor is mounted at a lower portion of the robot 1100 to enable proximity detection in this vicinity, such as to provide detection of objects nearby to the lower portion of the robot (e.g. objects on the floor/surface on which the robot 1100 is situated). In some implementations, one or more proximity sensors are mounted along other portions of the robot 1100, including middle and upper portions of the robot. Proximity sensors 1120 can be useful for avoiding collisions of the robot 1100 with objects in the local environment, detecting the presence of nearby objects, detecting gestures by a user in the vicinity of the robot, etc.

The robot 1100 includes a global positioning system (GPS) device/receiver 1122, which is configured to receive information from GPS satellites for determining the geo-location of the robot.

The robot 1124 includes one or more inertial/motion sensors 1124 that are capable of detecting movement and/or orientation of the robot. Examples of inertial/motion sensors include accelerometers, magnetometers, gyroscopes, etc.

The robot 1124 includes at least one projector 1126 that is capable of projecting images/video onto surfaces in the local environment. By way of example without limitation, the projector can be an LCD projector, LED projector, DLP projector, LCoS projector, pico projector, etc.

The robot 1100 includes a plurality of wheels/rollers, e.g. wheels/rollers 1130a and 1130b as shown, which are configured to enable the robot 1100 to move about the local environment. One or more of the wheels/rollers can be controlled by actuators (e.g. actuators 1132a and 1132b) to cause the wheels/rollers to rotate and thereby effect movement of the robot 1100. In some implementations, wheels/rollers can be multi-directional or omnidirectional, that is, capable of producing or facilitating movement in more than one direction or all directions.

The various components of the robot 1100 can be contained within a housing. In the illustrated implementation, an upper housing 1134a and a lower housing 1134b are included. The upper housing 1134a is configured to be rotatable relative to the lower housing 1134b, facilitated by a plurality of bearings 1136. In some implementations, an actuator 1138 is configured to rotate the upper housing 1134a. In various implementations, any of the various components of the robot 1100 can be mounted to or within the upper housing 1134a, and configured to be rotated/moved when the upper housing 1134a is rotated, while others of the various components are mounted to or within the lower housing 1134b and not simultaneously rotated.

By way of example, in some implementations, the camera 1114, depth camera 1118, speaker 1110, and/or microphone 1112 is/are mounted to the upper housing 1134a, while the projector 1126 is mounted to the lower housing 1134b. The components mounted to the upper housing 1134a can be rotated with the upper housing 1134a, independent of the projector 1126. This can enable the robot 1100 to direct the projector 1126 independently of the camera 1114, depth camera 1118, speaker 1110, and/or microphone 1112. For example, this may be useful to allow the camera 1114, depth camera 1118, speaker 1110, and/or microphone 1112 to be directed toward a user, while the projector 1126 is directed toward a wall or other projection surface.

Figure 6:
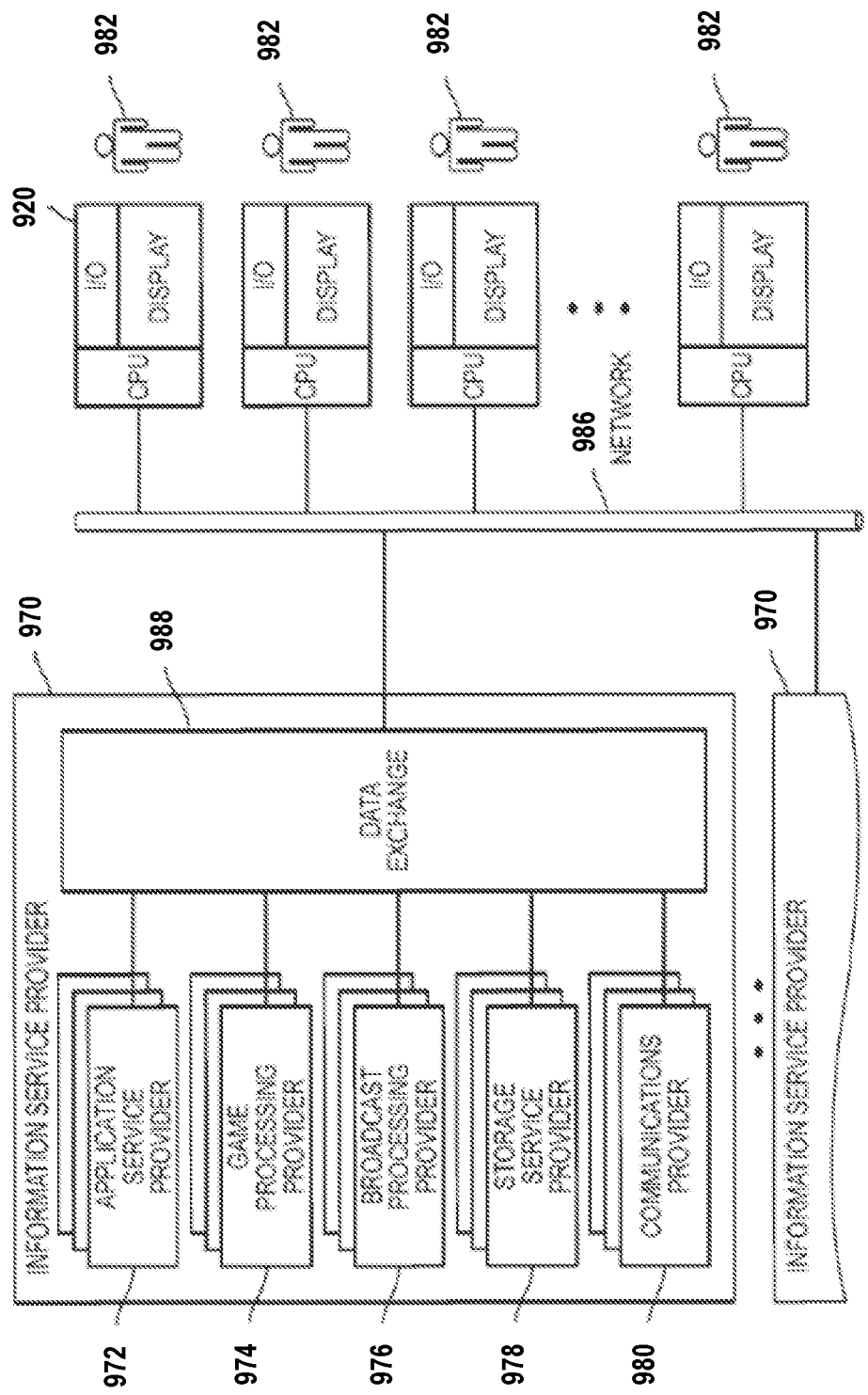
FIG. 6 illustrates an embodiment of an Information Service Provider architecture.

FIG. 6 illustrates an embodiment of an Information Service Provider architecture. Information Service Provider (ISP) 970 delivers a multitude of information services to users 982 geographically dispersed and connected via network 986. An ISP can deliver just one type of service, such as stock price updates, or a variety of services such as broadcast media, news, sports, gaming, etc. Additionally, the services offered by each ISP are dynamic, that is, services can be added or taken away at any point in time. Thus, the ISP providing a particular type of service to a particular individual can change over time. For example, a user may be served by an ISP in near proximity to the user while the user is in her home town, and the user may be served by a different ISP when the user travels to a different city. The home-town ISP will transfer the required information and data to the new ISP, such that the user information "follows" the user to the new city making the data closer to the user and easier to access. In another embodiment, a master-server relationship may be established between a master ISP, which manages the information for the user, and a server ISP that interfaces directly with the user under control from the master ISP. In another embodiment, the data is transferred from one ISP to another ISP as the client moves around the world to make the ISP in better position to service the user be the one that delivers these services.

ISP 970 includes Application Service Provider (ASP) 972, which provides computer-based services to customers over a network (e.g., including by way of example without limitation, any wired or wireless network, LAN, WAN, WiFi, broadband, cable, fiber optic, satellite, cellular (e.g. 4G, 5G, etc.), the Internet, etc.). Software offered using an ASP model is also sometimes called on-demand software or software as a service (SaaS). A simple form of providing access to a particular application program (such as customer relationship management) is by using a standard protocol such as HTTP. The application software resides on the vendor's system and is accessed by users through a web browser using HTML, by special purpose client software provided by the vendor, or other remote interface such as a thin client.

Services delivered over a wide geographical area often use cloud computing. Cloud computing is a style of computing in which dynamically scalable and often virtualized resources are provided as a service over the Internet. Users do not need to be an expert in the technology infrastructure in the "cloud" that supports them. Cloud computing can be divided into different services, such as Infrastructure as a Service (IaaS), Platform as a Service (PaaS), and Software as a Service (SaaS). Cloud computing services often provide common business applications online that are accessed from a web browser, while the software and data are stored on the servers. The term cloud is used as a metaphor for the internet (e.g., using servers, storage and logic), based on how the internet is depicted in computer network diagrams and is an abstraction for the complex infrastructure it conceals.

Further, ISP 970 includes a Game Processing Server (GPS) 974 which is used by game clients to play single and multiplayer video games. Most video games played over the internet operate via a connection to a game server. Typically, games use a dedicated server application that collects data from players and distributes it to other players. This requires a separate server to host the server application. In another embodiment, the GPS establishes communication between the players and their respective game-playing devices exchange information without relying on the centralized GPS. In yet another embodiment, the GPS can be used to distribute game copies to nodes via download and to facilitate a discovery process by which nodes can initiate a peer-to-peer connection with other nodes interested in playing a game in a serverless environment.

Dedicated GPSs are servers which run independently of the client. Such servers are usually run on dedicated hardware located in data centers, providing more bandwidth and dedicated processing power. Dedicated servers are the preferred method of hosting game servers for most PC-based multiplayer games. Massively multiplayer online games run on dedicated servers usually hosted by the software company that owns the game title, allowing them to control and update content.

Broadcast Processing Server (BPS) 976 distributes audio or video signals to an audience. Broadcasting to a very narrow range of audience is sometimes called narrowcasting. The final leg of broadcast distribution is how the signal gets to the listener or viewer, and it may come over the air as with a radio station or TV station to an antenna and receiver, or may come through cable TV or cable radio (or "wireless cable") via the station or directly from a network. The internet may also bring either radio or TV to the recipient, especially with multicasting allowing the signal and bandwidth to be shared. Historically, broadcasts have been delimited by a geographic region, such as national broadcasts or regional broadcast. However, with the proliferation of fast internet, broadcasts are not defined by geographies as the content can reach almost any country in the world.

Storage Service Provider (SSP) 978 provides computer storage space and related management services. SSPs also offer periodic backup and archiving. By offering storage as a service, users can order more storage as required. Another major advantage is that SSPs include backup services and users will not lose all their data if their computers' hard drives fail. Further, a plurality of SSPs can have total or partial copies of the user data, allowing users to access data in an efficient way independently of where the user is located or the device being used to access the data. For example, a user can access personal files in the home computer, as well as in a mobile phone while the user is on the move.

Communications Provider 980 provides connectivity to the users. One kind of Communications Provider is an Internet Service Provider (ISP) which offers access to the Internet. The ISP connects its customers using a data transmission technology appropriate for delivering Internet Protocol datagrams, such as dial-up, DSL, cable modem, fiber, wireless or dedicated high-speed interconnects. The Communications Provider can also provide messaging services, such as e-mail, instant messaging, and SMS texting. Another type of Communications Provider is the Network Service Provider (NSP) which sells bandwidth or network access by providing direct backbone access to the Internet. Network service providers include telecommunications companies, data carriers, wireless communications providers, Internet service providers, cable television operators offering high-speed internet access, etc.

Data Exchange 988 interconnects the several modules inside ISP 970 and connects these modules to users 982 via network 986. Data Exchange 988 can cover a small area where all the modules of ISP 970 are in close proximity, or can cover a large geographic area when the different modules are geographically dispersed. For example, Data Exchange 988 can include a fast Gigabit Ethernet (or faster) within a cabinet of a data center, or an intercontinental virtual area network (VLAN).

Users 982 access the remote services with client device 920, which includes at least a CPU, a memory, a display and I/O. The client device can be a PC, a mobile phone, a netbook, tablet, gaming system, a PDA, etc. In one embodiment, ISP 970 recognizes the type of device used by the client and adjusts the communication method employed. In other cases, client devices use a standard communications method, such as HTML, to access ISP 970.

Embodiments of the present disclosure may be practiced with various computer system configurations including hand-held devices, microprocessor systems, microprocessor-based or programmable consumer electronics, minicomputers, mainframe computers and the like. The disclosure can also be practiced in distributed computing environments where tasks are performed by remote processing devices that are linked through a wire-based or wireless network.

With the above embodiments in mind, it should be understood that the disclosure can employ various computer-implemented operations involving data stored in computer systems. These operations are those requiring physical manipulation of physical quantities. Any of the operations described herein that form part of the disclosure are useful machine operations. The disclosure also relates to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The disclosure can also be embodied as computer readable code on a computer readable medium. Alternately, the computer readable code may be downloaded from a server using the data exchange interconnects described above. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

Although method operations may be described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Accordingly, the disclosure of the example embodiments is intended to be illustrative, but not limiting, of the scope of the disclosures, which are set forth in the following claims and their equivalents. Although example embodiments of the disclosures have been described in some detail for purposes of clarity of understanding, it will be apparent that certain changes and modifications can be practiced within the scope of the following claims. In the following claims, elements and/or steps do not imply any particular order of operation, unless explicitly stated in the claims or implicitly required by the disclosure.

What is claimed is:

1. A method for generating action sequence data for a character to be rendered in a video game, comprising:
during recording of an actor in a performance space to capture data to be processed to generate the action sequence data for the character to be rendered in the video game, the performance space is a real-world space having a controller for managing communication in the performance space;
providing, via the controller, a cue to the actor to perform an action that simulates making eye contact during a simulated interaction with a virtual object at a location in the performance space, wherein the actor corresponds to the character to be rendered in the video game, wherein the eye contact is defined by a line of sight between the actor and a portion of a robot at a coordinate relative to a base of the robot;
instructing, via the controller, the robot to move to the location in the performance space at which the actor is to simulate interaction with the virtual object;
instructing, via the controller, the robot to adjust a configuration of the robot when at the location, the configuration of the robot is adjusted by adjusting a physical attribute of the robot, the physical attribute when adjusted is placed at a three-dimensional location in the performance space in a configuration that corresponds to a scale of the virtual object in the video game to enable the actor to simulate interaction with the virtual object using the robot as a frame of reference at a scale based at least in part on the line of sight and the coordinate that minimizes a need to edit the action sequence data to correct scaling issues; and capturing the action by the actor when the actor performs the action that simulates interacting with the virtual object at the location in the performance space, wherein a database stores files of the captured action by the actor along with files of a plurality of other captured actions, and the captured actions are implemented in a later rendering of the video game to generate action sequences by the character when rendered in the video game.

2. The method of claim 1, wherein the location in the performance space corresponds to a virtual location of the virtual object in a virtual space of the video game, wherein a real distance in the performance space between the actor and the location is correlated to a virtual distance in the virtual space between the character and the virtual object, and wherein changes in the real distance are tracked to cause corresponding changes in the virtual distance.

3. The method of claim 1, wherein the virtual object is an animated object to be rendered in the video game.

4. The method of claim 3, wherein the action performed by the actor is one of a handshake with the animated object, a facial expression directed toward the animated object, a motion made by the character in relation to the animated object, a motion of input by the character made to or received from the animated object, or an interactive action made by the character in relation to the animated object.

5. The method of claim 1, wherein the robot includes an adjustable arm to which a prop representing a hand is attached, and wherein the instructing the robot to adjust the physical attribute of the robot includes instructing the robot to place the prop representing the hand at the three-dimensional location in the performance space that corresponds to an approximate location of an animated object's hand in a virtual space of the video game.

6. The method of claim 1, wherein the virtual object represents a physical object in a virtual space.

7. The method of claim 1, wherein the performance space is provided with a camera situated along a periphery of the performance space and a depth sensor disposed within the performance space to enable the capturing of the action by the actor in relation to the scale of the virtual object.

8. A method for generating action sequence data for a character to be rendered in a video game, comprising:

during recording of an actor in a performance space to capture data to be processed to generate the action sequence data for the character to be rendered in the video game, the performance space is a real-world space having a controller for managing communication in the performance space;

providing, via the controller, a cue to the actor to perform an action that simulates making eye contact during a simulated interaction with a virtual object at a location in the performance space, wherein the actor corresponds to the character to be rendered in the video game, wherein the eye contact is defined by a line of sight between the actor and a portion of a robot at a coordinate relative to a base of the robot;

instructing, via the controller, the robot to move to the location in the performance space at which the actor is to simulate interaction with the virtual object;

instructing, via the controller, the robot to adjust a configuration of the robot when at the location, the configuration of the robot is adjusted by adjusting a physical attribute of the robot, the physical attribute when adjusted is placed at a three-dimensional location in a configuration that corresponds to a scale of the virtual object in the video game to enable the actor to simulate interaction with the virtual object using the robot as a frame of reference at a scale based at least in part on the line of sight and the coordinate that minimizes a need to edit the action sequence data to correct scaling issues; and capturing the action by the actor when the actor performs the action that simulates interacting with the virtual object at the location in the performance space, wherein a database stores files of the captured action by the actor along with files of a plurality of other captured actions, and the captured actions are implemented in a later rendering of the video game to generate to action sequences by the character when rendered in the video game.

9. The method of claim 8, wherein the location in the performance space corresponds to a virtual location of the virtual object in a virtual space of the video game, wherein a real distance in the performance space between the actor and the location is correlated to a virtual distance in the virtual space between the character and the virtual object, and wherein changes in the real distance are tracked to cause corresponding changes in the virtual distance.

10. The method of claim 8, wherein the virtual object is one of an animated object or a non-animated object.

11. The method of claim 10, wherein the action performed by the actor is one of going around the animated object or the non-animated object, jumping over the animated object or the non-animated object, climbing over the animated object or the non-animated object, stepping on the animated object or the non-animated object, or an interactive action made by the character in relation to the animated object or the non-animated object.

12. The method of claim 10, wherein the virtual object is a non-animated object, and the non-animated object is one of a table, a fence, a wall, a rock, a game-generated object, or game-generated topography.

13. The method of claim 10, wherein the virtual object is an animated object, and the animated object is one of a vehicle, a river, or a game-generated character.

14. The method of claim 8, wherein the performance space is provided with a camera situated along a periphery of the performance space and a depth sensor disposed within the performance space to enable the capturing of the action by the actor in relation to the scale of the obstacle object.

15. A non-transitory computer readable medium containing program instructions for generating action sequence data for a character to be rendered in a video game, wherein execution of the program instructions by one or more processors of a computer system causes the one or more processors to carry out operations comprising:

during recording of an actor in a performance space to capture data to be processed to generate the action sequence data for the character to be rendered in the video game, the performance space is a real-world space having a controller for managing communication in the performance space;

providing, via the controller, a cue to the actor to perform an action that simulates making eye contact during a simulated interaction with a virtual object at a location in the performance space, wherein the actor corresponds to the character to be rendered in the video game, wherein the eye contact is defined by a line of sight between the actor and a portion of a robot at a coordinate relative to a base of the robot;

instructing, via the controller, the robot to move to the location in the performance space at which the actor is to simulate interaction with the virtual object;

instructing, via the controller, the robot to adjust a configuration of the robot when at the location, the configuration of the robot is adjusted by adjusting a physical attribute of the robot, the physical attribute when adjusted is placed at a three-dimensional location in the performance space in a configuration that corresponds to a scale of the virtual object in the video game to enable the actor to simulate interaction with the virtual object using the robot as a frame of reference at a scale based at least in part on the line of sight and the coordinate that minimizes a need to edit the action sequence data to correct scaling issues; and capturing the action by the actor when the actor performs the action that simulates interacting with the virtual object at the location in the performance space, wherein a database stores files of the captured action by the actor along with files of a plurality of other captured actions, and the captured actions are implemented in a later rendering of the video game to generate action sequences by the character when rendered in the video game.

16. The computer readable medium of claim 15, wherein the location in the performance space corresponds to a virtual location of the virtual object in a virtual space of the video game, wherein a real distance in the performance space between the actor and the location is correlated to a virtual distance in the virtual space between the character and the virtual object, and wherein changes in the real distance are tracked to cause corresponding changes in the virtual distance.

17. The computer readable medium of claim 15, wherein the performance space is provided with a camera situated along a periphery of the performance space and a depth sensor disposed within the performance space to enable the capturing of the action by the actor in relation to the scale of the virtual object.

* * * * *